United States Patent
Kuusela et al.

(10) Patent No.: US 9,609,275 B2
(45) Date of Patent: Mar. 28, 2017

(54) SINGLE-STREAM TRANSMISSION METHOD FOR MULTI-USER VIDEO CONFERENCING

(71) Applicant: Google Inc., Mountain View, CA (US)

(72) Inventors: Aki Kuusela, Palo Alto, CA (US); Aki Tikkala, Sunnyvale, CA (US); Ville-Mikko Rautio, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/794,251

(22) Filed: Jul. 8, 2015

(65) Prior Publication Data

US 2017/0013233 A1    Jan. 12, 2017

(51) Int. Cl.
*H04N 7/15* (2006.01)
*H04N 7/01* (2006.01)
*H04N 19/44* (2014.01)

(52) U.S. Cl.
CPC ............. *H04N 7/15* (2013.01); *H04N 7/0117* (2013.01); *H04N 19/44* (2014.11)

(58) Field of Classification Search
CPC combination set(s) only.
See application file for complete search history.

(56) References Cited

U.S. PATENT DOCUMENTS

| | | | |
|---|---|---|---|
| 338,127 A | 4/1968 | Rudolf et al. | |
| 5,477,542 A * | 12/1995 | Takahara | H04J 3/177 348/14.05 |
| 5,778,082 A | 7/1998 | Chu et al. | |
| 5,801,756 A | 9/1998 | Iizawa | |
| 5,953,050 A | 9/1999 | Kamata et al. | |

(Continued)

FOREIGN PATENT DOCUMENTS

| | | |
|---|---|---|
| EP | 2288152 A1 | 2/2011 |
| WO | WO2008066593 A2 | 6/2008 |
| WO | WO2011150128 A1 | 12/2011 |

OTHER PUBLICATIONS

Babonneau, et al., "SSRC Multiplexing for Unicast and Multicast RTP Sessions," Network Working Group Internet-Draft (IETF Trust 2010).

(Continued)

*Primary Examiner* — Joseph J Nguyen
*Assistant Examiner* — Phung-Hoang J. Nguyen
(74) *Attorney, Agent, or Firm* — Young Basile Hanlon & MacFarlane, P.C.

(57) ABSTRACT

A method includes transmitting, from an encoding client to a first remote computing system, an encoded video stream that includes a plurality of first-resolution frames and a plurality of second-resolution frames. The method also includes transmitting, from the encoding client to the first remote computing system in the encoded video stream, a first-resolution non-displayed anchor frame. The method also includes receiving, at the encoding client from the first remote computing system, a request to change resolution. In response to receiving the request to change resolution, the method includes transmitting, from the encoding client to the first remote computing system in the encoded video stream, a set of frames that are encoded relative to the first-resolution non-displayed anchor frame.

19 Claims, 15 Drawing Sheets

(56) References Cited

U.S. PATENT DOCUMENTS

| | | |
|---|---|---|
| 5,963,547 A | 10/1999 | O'Neil et al. |
| 6,011,868 A | 1/2000 | van den Branden et al. |
| 6,028,639 A | 2/2000 | Bhatt et al. |
| 6,072,522 A | 6/2000 | Ippolito et al. |
| 6,163,335 A | 12/2000 | Barraclough |
| 6,453,336 B1 | 9/2002 | Beyda et al. |
| 6,580,754 B1 | 6/2003 | Wan et al. |
| 6,603,501 B1 | 8/2003 | Parry et al. |
| 6,614,936 B1 | 9/2003 | Wu et al. |
| 6,621,514 B1 | 9/2003 | Hamilton |
| 6,658,618 B1 | 12/2003 | Gu et al. |
| 6,757,259 B1 | 6/2004 | Hamilton |
| 6,775,247 B1 | 8/2004 | Shaffer et al. |
| 6,795,863 B1 | 9/2004 | Doty, Jr. |
| 6,941,021 B2 | 9/2005 | Goldstein et al. |
| 6,992,692 B2 | 1/2006 | Gu et al. |
| 7,007,098 B1 | 2/2006 | Smyth et al. |
| 7,084,898 B1 | 8/2006 | Firestone et al. |
| 7,123,696 B2 | 10/2006 | Lowe |
| 7,133,362 B2 | 11/2006 | Chu et al. |
| 7,143,432 B1 | 11/2006 | Brooks et al. |
| 7,206,016 B2 | 4/2007 | Gu |
| 7,253,831 B2 | 8/2007 | Gu |
| 7,349,944 B2 | 3/2008 | Vernon et al. |
| 7,352,808 B2 | 4/2008 | Ratakonda et al. |
| 7,593,031 B2 | 9/2009 | Root et al. |
| 7,619,645 B2 | 11/2009 | Cockerton |
| 7,627,886 B2 | 12/2009 | Barbanson et al. |
| 7,646,736 B2 | 1/2010 | Yang et al. |
| 7,692,683 B2 | 4/2010 | Kenoyer et al. |
| 7,698,724 B1 | 4/2010 | Day |
| 7,716,283 B2 | 5/2010 | Thukral |
| 7,759,756 B2 | 7/2010 | Lee et al. |
| 7,769,756 B2 | 8/2010 | Krikorian et al. |
| 7,864,251 B2 | 1/2011 | Gu et al. |
| RE42,288 E | 4/2011 | Degioanni |
| 7,932,920 B2 | 4/2011 | Lia et al. |
| 7,987,492 B2 | 7/2011 | Liwerant et al. |
| 8,010,652 B2 | 8/2011 | Wang et al. |
| 8,060,608 B2 | 11/2011 | Wang et al. |
| 8,117,638 B2 | 2/2012 | Perlman |
| 8,164,618 B2 | 4/2012 | Yang et al. |
| 8,228,982 B2 | 7/2012 | Qian et al. |
| 8,264,521 B2 | 9/2012 | Triplicane et al. |
| 8,265,168 B1 | 9/2012 | Masterson et al. |
| 8,276,195 B2 | 9/2012 | Hegde et al. |
| 8,325,821 B1 | 12/2012 | Kizhepat et al. |
| 8,379,677 B2 | 2/2013 | Leung et al. |
| 8,462,856 B2 | 6/2013 | Eleftheriadis et al. |
| 8,527,649 B2 | 9/2013 | Wexler et al. |
| 8,549,571 B2 | 10/2013 | Loher et al. |
| 8,588,280 B2 | 11/2013 | Oh et al. |
| 8,749,612 B1 | 6/2014 | Ellner et al. |
| 8,791,982 B1 | 7/2014 | Ellner |
| 8,797,378 B1 | 8/2014 | Holmer |
| 8,917,309 B1 | 12/2014 | Westin |
| 9,210,302 B1 | 12/2015 | Holmer et al. |
| 2001/0042114 A1 | 11/2001 | Agraharam et al. |
| 2002/0033880 A1 | 3/2002 | Sul et al. |
| 2002/0118272 A1 | 8/2002 | Bruce-Smith |
| 2003/0091000 A1 | 5/2003 | Chu et al. |
| 2003/0160862 A1 | 8/2003 | Charlier et al. |
| 2004/0119814 A1 | 6/2004 | Clisham et al. |
| 2004/0264580 A1* | 12/2004 | Chiang Wei Yin .. H04N 19/176 375/240.25 |
| 2005/0008240 A1 | 1/2005 | Banerji et al. |
| 2005/0062843 A1 | 3/2005 | Bowers et al. |
| 2005/0140779 A1 | 6/2005 | Schulz et al. |
| 2006/0023644 A1 | 2/2006 | Jang et al. |
| 2006/0164552 A1 | 7/2006 | Cutler |
| 2007/0005804 A1 | 1/2007 | Rideout |
| 2007/0035819 A1 | 2/2007 | Bahatt et al. |
| 2007/0081794 A1 | 4/2007 | Baynger et al. |
| 2007/0120971 A1 | 5/2007 | Kennedy |
| 2007/0127671 A1 | 6/2007 | Chua et al. |
| 2007/0200923 A1 | 8/2007 | Eleftheriadis et al. |
| 2007/0280194 A1 | 12/2007 | Wu et al. |
| 2007/0294346 A1 | 12/2007 | Moore et al. |
| 2008/0218582 A1 | 9/2008 | Buckler |
| 2008/0267282 A1 | 10/2008 | Kalipatnapu et al. |
| 2008/0316297 A1 | 12/2008 | King et al. |
| 2009/0045987 A1 | 2/2009 | Cho et al. |
| 2009/0079811 A1 | 3/2009 | Brandt |
| 2009/0185621 A1* | 7/2009 | Cho ..................... H04N 19/176 375/240.16 |
| 2010/0141655 A1 | 6/2010 | Belinsky et al. |
| 2010/0271457 A1 | 10/2010 | Thapa |
| 2010/0309984 A1 | 12/2010 | Liu et al. |
| 2011/0018962 A1 | 1/2011 | Lin et al. |
| 2011/0040562 A1 | 2/2011 | Doyle et al. |
| 2011/0069237 A1 | 3/2011 | Wang et al. |
| 2011/0074910 A1 | 3/2011 | King et al. |
| 2011/0074913 A1 | 3/2011 | Kulkarni et al. |
| 2011/0131144 A1 | 6/2011 | Ashour et al. |
| 2011/0141221 A1 | 6/2011 | Satterlee et al. |
| 2011/0205332 A1 | 8/2011 | Jeong et al. |
| 2011/0206113 A1 | 8/2011 | Bivolarsky et al. |
| 2011/0310217 A1 | 12/2011 | Lee et al. |
| 2012/0098923 A1 | 4/2012 | Westin |
| 2012/0327172 A1 | 12/2012 | El-Saban et al. |
| 2013/0088600 A1 | 4/2013 | Wu et al. |
| 2013/0111051 A1 | 5/2013 | Yaron et al. |
| 2013/0176383 A1 | 7/2013 | Satterlee et al. |
| 2013/0201279 A1 | 8/2013 | Civanlar et al. |
| 2013/0290494 A1 | 10/2013 | Goudarzi et al. |
| 2013/0346564 A1 | 12/2013 | Warrick et al. |
| 2014/0104373 A1* | 4/2014 | Kato ..................... H04L 65/403 348/14.08 |
| 2014/0125755 A1 | 5/2014 | Thomas |
| 2014/0267560 A1 | 9/2014 | Bright-Thomas |

OTHER PUBLICATIONS

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

EP Search Report for EP Application No. 10188901.2 dated Jun. 9, 2011, citine new art.

Firestone, S., et al. "Lip SyxNChronization in Video ConferexNC-ing." Voice and Video ConferexNCing Fundamentals. Cisco Systems, IxNC. Mar. 2007.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, IxNC. Dated Mar. 28, 2005.

Schulzrinne, H., et al. RTP: A Transport Protocol for Real-Time Applications, RFC 3550. The Internet Society. Jul. 2003.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment

(56) References Cited

OTHER PUBLICATIONS

2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP8 Data Format and Decoding Guide. WebM Project. Google On2. Dated: Dec. 1, 2010.
VP6 Bitstream & Decoder Specification. Version 1.03. On2 Technologies, IxNC. Dated Oct. 29, 2007.
VP6 Bitstream & Decoder Specification. Version 1.02. On2 Technologies, IxNC. Dated Aug. 17, 2006.
U.S. Appl. No. 13/711,714, filed Dec. 12, 2012 (abandoned prior to publication).
ISR and Written Opinion in related matter PCT/US2016/040165, mailed Sep. 13, 2016.
Karczewicz, Marta et al.; "The SP- and SI-Frames Design for H.264/AVC"; IEEE Transactions on Circuits and Systems for Video Technology, vol. 13, No. 7, Jul. 2003; pp. 637-644.
Zhou, Xiaosong et al.; "Efficient and Flexible Video Streaming for H.264/AVC"; Integrated Media Systems Center and Department of Electrical Engineering; University of Southern California, Los Angeles, CA, U.S.A.; 6 pages.
Jia, Jie et al.; "SP-Picture for SVC"; Joint Video Team (JVT) of ISO/IEC MPEG & ITU-T VCEG (ISO/IEC JTC1/SC29/WG11 and ITU-T SG16 Q.6; 19th Meeting: Geneva, CH, Mar. 31, 2006-Apr. 7, 2006; pp. 1-23.

\* cited by examiner

SINGLE-STREAM TRANSMISSION METHOD FOR MULTI-USER VIDEO CONFERENCING

TECHNICAL FIELD

This disclosure relates to encoding and decoding visual data, such as video stream data, for transmission or storage and subsequent display, with particular reference to multi-user video conferencing.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. In addition, video data can be transmitted or stored at varying spatial resolutions in order to save transmission or storage bandwidth.

One application particularly sensitive to transmission or storage bandwidth is multi-user video conferencing. Multi-user video conferencing is gaining popularity amongst mobile and desktop users. In order to provide an acceptable user experience, multi-user video conferencing applications balance quality against performance. One way in which this is done is by using a scalable frame encoding scheme to adapt to changing internet bandwidth conditions.

SUMMARY

One aspect of the disclosed embodiments is a method that includes transmitting, from an encoding client to a first remote computing system, an encoded video stream that includes a plurality of first-resolution frames and a plurality of second-resolution frames. The method also includes transmitting, from the encoding client to the first remote computing system in the encoded video stream, a first-resolution non-displayed anchor frame. The method also includes receiving, at the encoding client from the first remote computing system, a request to change resolution. In response to receiving the request to change resolution, the method includes transmitting, from the encoding client to the first remote computing system in the encoded video stream, a set of frames that are encoded relative to the first-resolution non-displayed anchor frame.

Another aspect of the disclosed embodiments is a method that includes receiving, at a first decoding client from a first remote computing system, an encoded video stream that includes a plurality of first-resolution frames, and decoding, at the first decoding client, at least some frames from the plurality of first-resolution frames. The method also includes receiving, at the first decoding client from the first remote computing system, a first-resolution non-displayed anchor frame and decoding, at the first decoding client, the first-resolution non-displayed anchor frame. Subsequent to decoding the first-resolution non-displayed anchor frame, the method includes receiving, at the first decoding client, at least one second resolution frame that is encoded relative to the decoded first-resolution non-displayed anchor frame, and decoding, at the first decoding client, the at least one second resolution frame using the decoded first-resolution non-displayed anchor frame.

Another aspect of the disclosed embodiments is a method that includes receiving, from an encoding client at a video conference server, an encoded video stream that includes a plurality of first-resolution frames and a plurality of second-resolution frames. The method also includes transmitting the plurality of first resolution frames to at least some decoding clients from the plurality of decoding clients and transmitting the plurality of second resolution frames to at least some decoding clients from the plurality of decoding clients. The method also includes receiving, from the encoding client at the video conference server in the encoded video stream, a first-resolution non-displayed anchor frame, and transmitting the first-resolution non-displayed anchor frame to all of the plurality of decoding clients. The method also includes transmitting, to the encoding client from the video conference server, a request to change resolution, and in response to receiving the request to change resolution, receiving, from the encoding client at the video conference server in the encoded video stream, a set of frames that are encoded relative to the first-resolution non-displayed anchor frame and transmitting one or more frames from the set of frames to each of the plurality of decoding clients.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
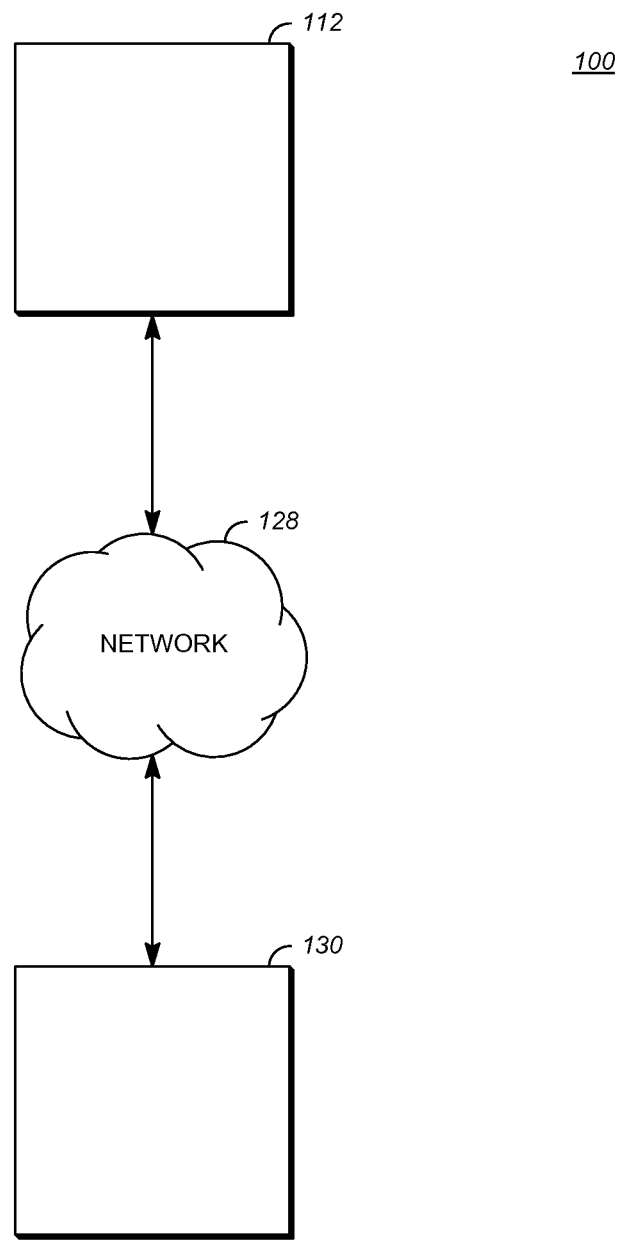
FIG. 1 is a schematic of a video encoding and decoding system.

Digital video is used for various purposes including, for example, remote business meetings via video conferencing, high definition video entertainment, video advertisements, and sharing of user-generated videos. In some applications, digital video streams can be encoded at varying spatial resolutions in order to save transmission or storage bandwidth. For example, in a video conferencing system, one or more video streams can be encoded, transmitted and displayed at multiple resolutions, such as a low resolution, a medium resolution, and a high resolution.

A video conferencing system can, at times, change the resolution at which video data streams are encoded and/or transmitted. For example, high-resolution video streams can be switched to a low-resolution and low-resolution video streams can switch to a high-resolution. Decisions as to which video streams are to be transmitted at which resolution can be made automatically by a video conferencing system or the decisions can be made manually by the participants or a moderator. A server, such as a relay server, can be a separate computing device that receives and re-transmits video data streams while instructing computing devices that represent participants as to what resolutions at which to encode and transmit video data. In some cases the server can be a software program executing on one or more computing devices representing participants in the video conference. Video conferences can also be conducted in peer-to-peer fashion where each participant selects the resolution with which to receive various video data streams with no video conferencing server involved.

One technique for switching resolutions of video streams can be referred to as simulcasting. In simulcasting, each participant in a video conference can simultaneously encode and transmit two or more video data streams. The data streams can be sent to a video conference server for relay to other participants, or can be sent directly to the other participants. In an example in which two video data streams are sent to the server, one video data stream includes high-resolution video data and one video data stream includes low-resolution video data. The video conference serve typically transmits one of the low resolution video data or the high resolution data to each of the participants based on control information. Typically, each participant receives only frames of the resolution that it is actively displaying. When a participant switches to a different resolution a frame at the new resolution is coded and transmitted to all participants that are displaying that resolution. This frame is often called an I-frame or an intra-frame. Thus, a resolution change for one of the participants will affect all of the participants due to the need to transmit the intra-frame. Transmission of this frame can cause quality degradation for a small period of time, which can be annoying to participants.

Another technique for switching video data stream resolution can be referred to as multi-resolution or scalable coding. In this scheme, video is coded at multiple resolutions is transmitted to a server either in a single stream or in multiple streams. The server can then select which of the resolutions to send to which participants based on control information. Multi-resolution or scalable coding has coding losses compared to an optimal one-resolution coding. During video switching, it may also take time for the high-resolution video quality to build up. Similarly to simulcasting, this can cause quality degradation that is annoying to participants.

According to the teachings herein, each encoding client transmits a video stream that includes video frames at multiple resolutions. These frames can be relayed to a plurality of decoding clients by a video conference server or can be transmitted directly to the plurality of clients. In implementations where the video conference server is used, it forwards video frames from the encoded video stream to the decoding clients based on the resolution being actively decoded at the particular decoding client. Periodically, the encoding client transmits a reference frame that is forwarded to all decoding clients but is not displayed. The non-displayed anchor frame can transmitted to all of the decoding clients at a single resolution regardless of the video resolution being actively decoded by the respective client. When one of the decoding clients requests a change in resolution, the non-displayed anchor frame can be utilized in conjunction with reference frame scaling to allow the change in resolution to occur without requiring the encoding client to transmit a keyframe. Therefore, the increased bandwidth consumption associated with sending a keyframe is avoided.

FIG. 1 is a schematic of a video encoding and decoding system 100 in which the systems and methods described herein can be implemented. An exemplary transmitting station 112 can be, for example, a computer having an internal configuration of hardware such as that described in FIG. 2. However, other suitable implementations of the transmitting station 112 are possible. For example, the processing of transmitting station 112 can be distributed among multiple devices.

A network 128 can connect the transmitting station 112 and a receiving station 130 for encoding and decoding of a video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
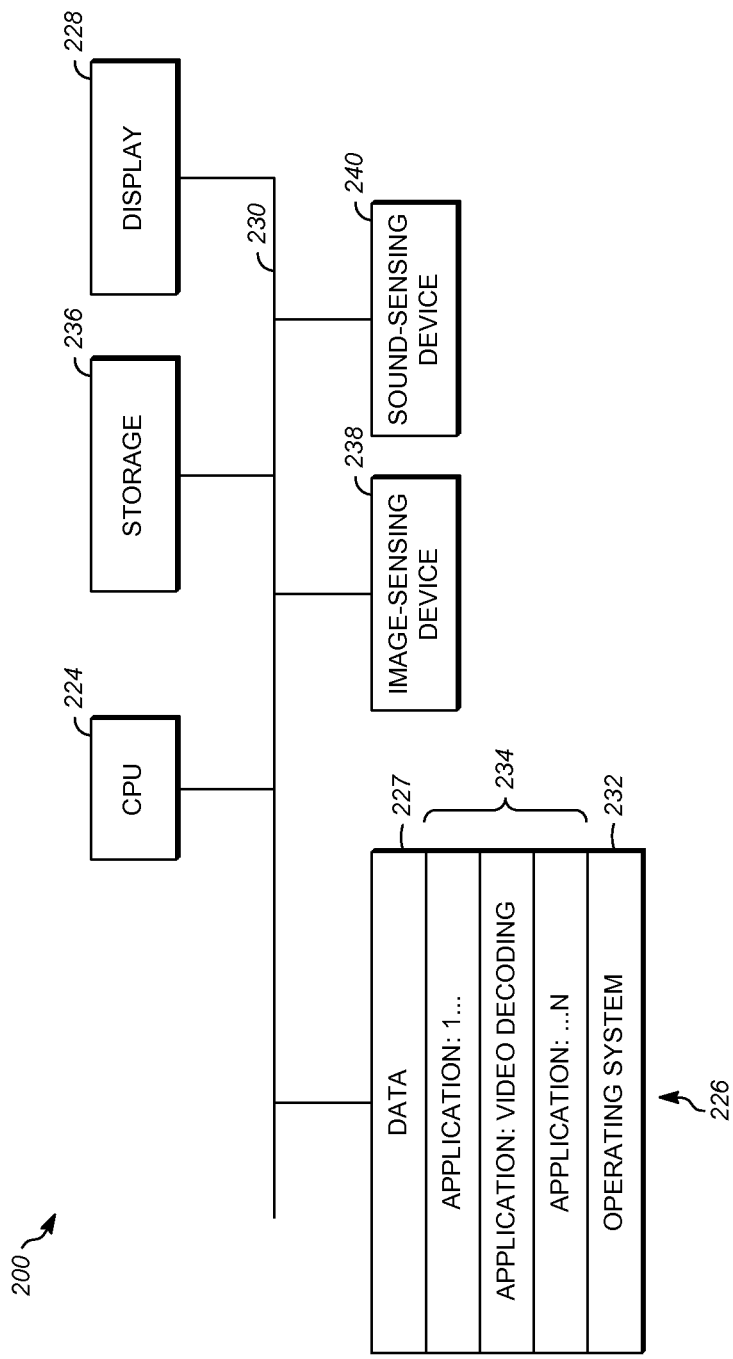
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, the receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

As will be explained further herein, the transmitting station 112 and the receiving station 130 are examples of devices that can be included in the video encoding and decoding system 100. Additional devices can be included, such as a video conference server that relays transmissions from the transmitting station 112 to the receiving station 130.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as the memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. As shown, for example, application programs 234 can include applications 1 through N, which further include an that performs a method described here. Computing device 200 can also include a secondary storage 236 that can be, for example, a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
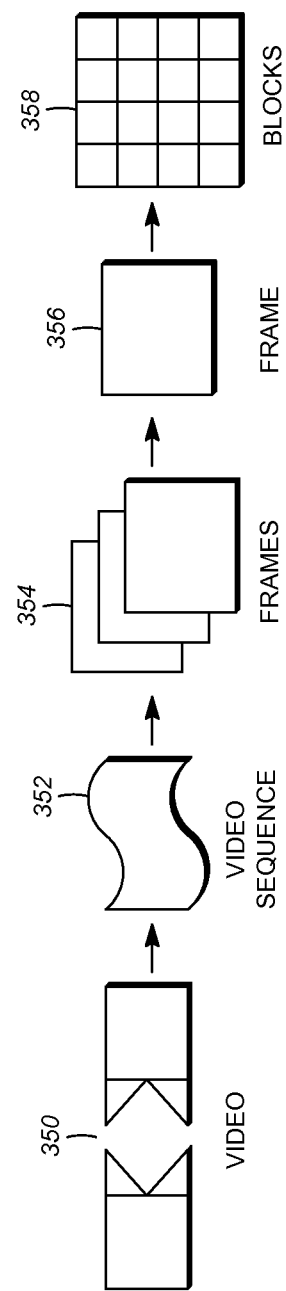
FIG. 3 is a diagram of a typical video stream to be encoded and subsequently decoded.

FIG. 3 is a diagram of an example of a video 350 to be encoded and subsequently decoded. Video 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, single frame 356 can be divided into a series of blocks 358, which can contain data corresponding to, for example, 16×16 pixels in frame 356. The blocks can also be arranged in planes of data. For example, a corresponding block in each plane can respectively contain luminance and chrominance data for the pixels of the block. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
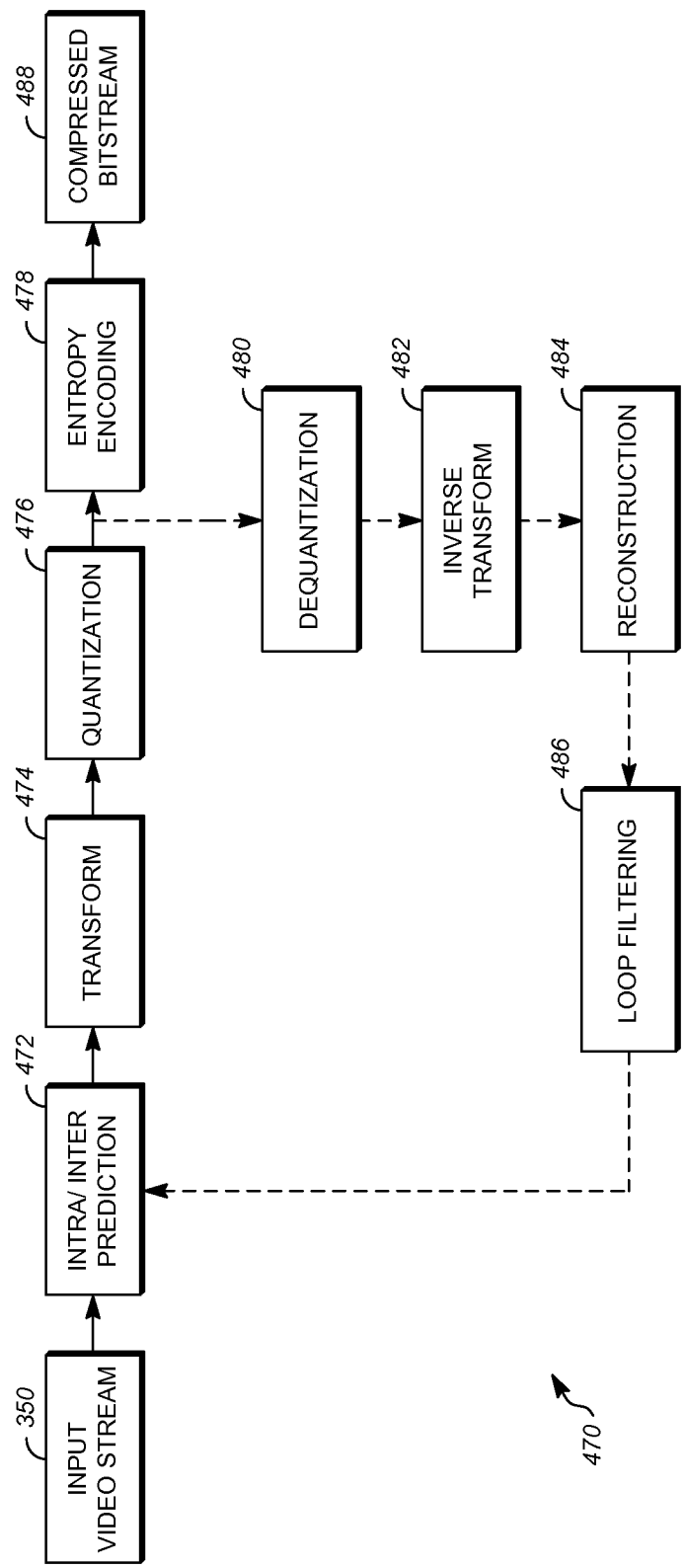
FIG. 4 is a block diagram of a video compression system in accordance with an aspect of this disclosure.

FIG. 4 is a block diagram of an encoder 470 in accordance with an aspect of this disclosure. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. Encoder 470 has the following stages to perform the various functions in a forward path (shown by the solid connection lines) to produce an encoded or compressed bitstream 488 using input video 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in a reconstruction path: a dequantization stage 480, an inverse transform stage 482, a reconstruction stage 484, and a loop filtering stage 486. Other structural variations of encoder 470 can be used to encode video 350.

When video 350 is presented for encoding, each frame 356 within the video 350 can be processed in units of blocks 358. At the intra/inter prediction stage 472, each block can be encoded using intra-frame prediction (prediction using blocks within a single frame) or inter-frame prediction (prediction using blocks from a different frame). In any case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video stream and the terms are used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
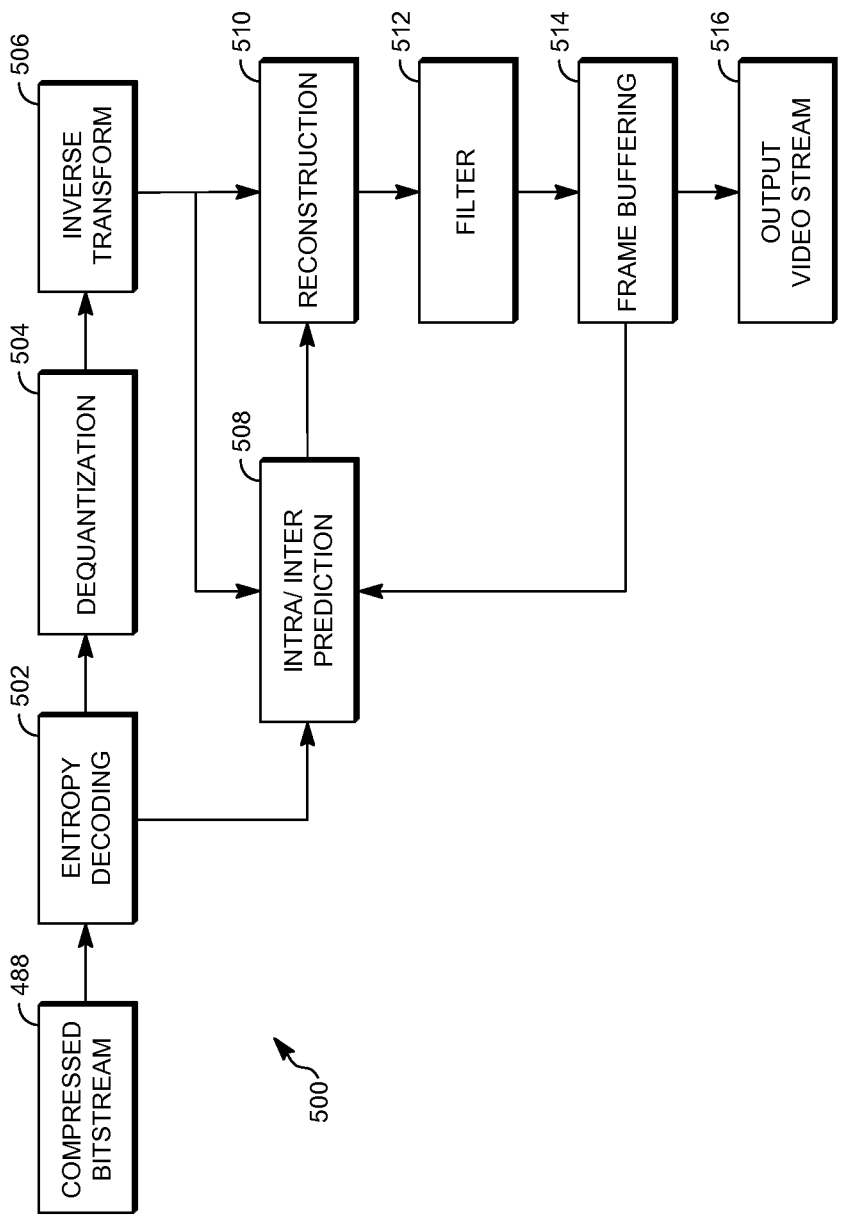
FIG. 5 is a block diagram of a video decompression system in accordance with another aspect of this disclosure.

FIG. 5 is a block diagram of a decoder 500 in accordance with an implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included, for example, in transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a filtering stage 512, which can include loop filtering and/or deblocking and a frame buffering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488 such as modes and motion vectors, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Filtering stage 512 can be applied to the reconstructed block to reduce blocking artifacts. Information can then be held in a frame buffer at frame buffering stage 514 for subsequent use in decoding or output. A post-processing stage can be applied to the reconstructed block to further refine the image. The result of the process performed by the decoder is output as output video stream 516. Output video stream 516 can also be referred to as a decoded video stream and the terms are used interchangeably herein.

Other variations of decoder 500 can be used to decode compressed bitstream 488. For example, decoder 500 can produce output video stream 516 without post-processing.

Figure 6:
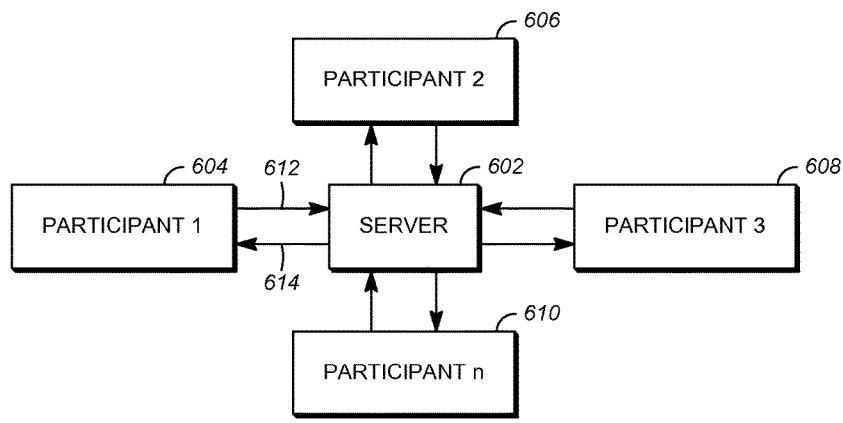
FIG. 6 is a diagram of a video conferencing system in which aspects of this disclosure can be implemented.

FIG. 6 shows a video conferencing system 600 that can be utilized to implement the systems and methods described herein. The video conferencing system 600 is an example of a multi-point video conference system in relay mode. Generally, each client or terminal has at least one encoder and sends one or more video streams to a relay server. The resolution, frame rate and bitrate, etc., are controlled by the relay server or some other controllers. Generally, each client or terminal receives one or more encoded video streams that include video captured at one of the other clients. Thus, each client encodes and transmits video, and also receives and decodes video. Depending on the functionality being described, clients may be referred to herein as encoding clients or decoding clients. Clients may also be referred to as endpoints.

The video conferencing system 600 includes server 602 and participants 604, 606, 608, and 610. The server 602 and the participants 604, 606, 608, and 610 can each be implemented in the same manner and with the same hardware as described with respect to the transmitting station 112 and the receiving station 130.

The participants send an encoded video stream, for example, a video stream 612, to server 602. As will be discussed herein the video stream 612 can include video frames at multiple resolutions. Server 602 receives the encoded video streams and sends to the participants 604, 606, 608, and 610 a return signal, such as a return signal 614, that includes portions of the video streams received from the other participants. The content of the video streams transmitted to each of the participants includes video for some or all of the other participants, at a certain resolution.

At any time during the video conference, a request to change the resolution of the video sent to one of the participants 604, 606, 608, or 610 can be made. The request can be made by the server 602 or by one of the participants 604, 606, 608, or 610. For example, one of the participants 604, 606, 608, or 610 can transmit, to the server 602, a request to change resolution. This request will be relayed from the server 602 to the other participants, and will result in changes in operation at the server 602 and the other participants in order to effect the resolution change at the participant that made the request, as will be explained further herein.

Figure 7:
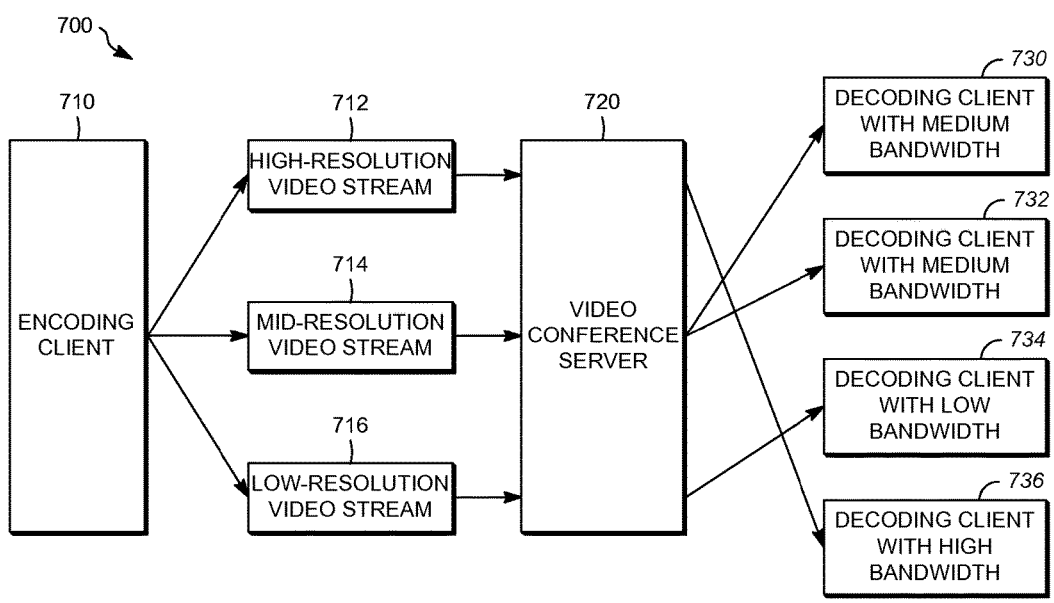
FIG. 7 is a diagram showing simulcast-based multiparty video conferencing.

FIG. 7 shows a prior art system 700 in which an encoding client 710 transmits video streams to a video conference server 720. The video conference server 720 receives the video streams and transmits the video streams to a plurality of decoding clients. The video streams that are encoded and transmitted by the encoding client 710 include a high-resolution video stream 712, a medium-resolution video stream 714, and a low-resolution video stream 716. The video streams 712, 714, 716 are independent of one another.

The video conference server 720 receives the video streams 712, 714, 716 and distributes them to the decoding clients according to the available bandwidth of each of the decoding clients. In this example, the decoding clients include a first decoding client 730 having medium bandwidth, a second decoding client 732 having medium bandwidth, a third decoding client 734 having low bandwidth, and a fourth decoding client 736 having high bandwidth. The video conference server 720 forwards the high-resolution video stream 712 to the fourth decoding client 736, forwards the medium-resolution video stream 714 to the first decoding client 730 and the second decoding client 732, and forwards the low-resolution video stream 716 to the third decoding client 734.

In the simulcast approach utilized in the system 700, inefficiency is experienced when a different resolution of video needs to be sent to one of the decoding clients 730, 732, 734, 736. For example, if one of the decoding clients experiences a drop in the available bandwidth and can no longer sustain the video resolution that they have been decoding, the video conference server determines that the video stream being sent to that particular decoding client needs to be switched. In order to switch the video stream being sent to one of the decoding clients, the video conference server 720 transmits a request to the encoding client 710, where the requests asks the encoding client 710 to create and transmit an independently decodable key frame update for the video stream that the decoding client needs to switch to. Because key frames do not compress as well as temporally predicted frames, this causes an increased bandwidth usage by the encoding client 710, the decoding client that requested the resolution change, and all of the other decoding clients that are displaying the resolution that the decoding client needs to switch to, since they also receive the independently decodable key frame update.

Figure 8:
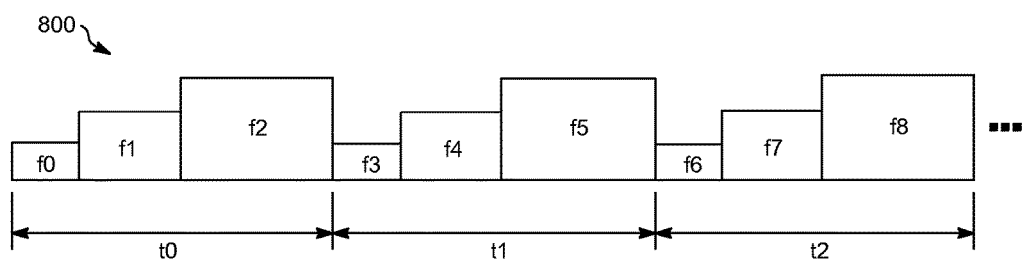
FIG. 8 is a diagram showing a single stream containing video frames of various resolutions.

FIG. 8 shows a single stream 800 of video frames that can be transmitted by an encoding client. The single stream 800 includes frames of three different resolutions that are included in the same stream. The frames shown in the single stream 800 correspond to three different time periods labeled $t_0$, $t_1$, and $t_2$. Each of the time periods $t_0$, $t_1$, and $t_2$ can correspond to a single timestamp for the frames that are included within the respective time period. The single stream 800 includes frames $F_0$, $F_1$, and $F_2$ within time period $t_0$. The single stream 800 includes frames $F_3$, $F_4$, and $F_5$ within time period $t_1$. The single stream 800 includes frames $F_6$, $F_7$, and $F_8$ within time period $t_2$. Frames $F_0$, $F_3$, and $f_6$ are low-resolution frames, while frames $F_1$, $F_4$, and $F_7$ are medium-resolution frames, and frames $F_2$, $F_5$, and $F_8$ are high-resolution frames.

In FIG. 8, three frames of different resolutions are included within each of the time periods by way of example. Numbers of frames other than three could be included in each time period at different resolutions, such as frames having two different resolutions or frames having four different resolutions within each time period.

All of the frames within a single time period can be representations of the same image. For example, frames $F_0$, $F_1$, and $F_2$ can be representations of a single video image at low-resolution, medium-resolution, and high-resolution, respectively.

Figure 9:
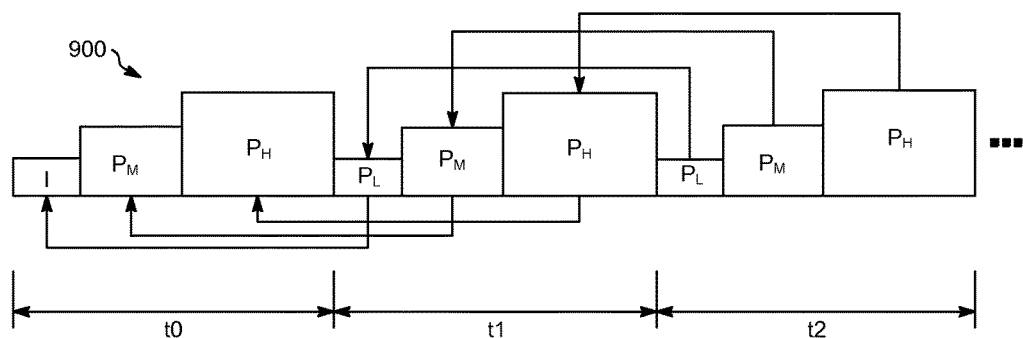
FIG. 9 is a diagram showing frame types and prediction in a single stream of video frames during video conference start-up.

FIG. 9 shows a single stream 900 of video frames 900 during video conference start-up. The frames in the single stream 900 are transmitted from an encoding client to a video conference server for relay to decoding clients.

The frames located in time period $t_0$ are the first frames that are transmitted during a video conference. In time period $t_0$, the low-resolution frame is an intra-frame. An intra-frame is encoded with reference to no other frames and can be decoded with reference to no other frames.

The medium-resolution frame in time period $t_0$ is encoded with reference to the low-resolution intra-frame from time period $t_0$. This is done by reference frame scaling. In particular, the medium-resolution frame in time period $t_0$ is encoded with reference to a scaled-up version of the intra-frame. Thus, to decode the medium-resolution frame in time period $t_0$, the decoding client will require copies of the low-resolution intra-frame and the medium-resolution predicted frame from time period $t_0$, and will utilize reference frame scaling by decoding the low-resolution intra-frame, scaling it up to the size of the medium-resolution predicted frame, and then decoding the medium-resolution predicted frame with reference to the scaled-up version of the low-resolution intra-frame.

The high-resolution predicted frame in time period $t_0$ is also encoded with reference to the low-resolution intra-frame for time period $t_0$, the medium-resolution predicted frame for time period $t_0$, or both. For example, the high-resolution predicted frame in time period $t_0$ can be decoded using the low-resolution intra-frame and the medium-resolution predicted frame from time period $t_0$ using reference frame scaling, as previously described.

Subsequent to time period $t_0$, all of the low-resolution, medium-resolution, and high-resolution frames are encoded with reference to the same resolution frame from a previous time period. In some implementations, each of the low-resolution, medium-resolution, and high-resolution frames from a certain time period are encoded with respect to the same resolution frame from the immediately preceding time period. In other implementations, predicted frames from time periods subsequent to time period $t_0$ can be encoded with reference to same-resolution frames from time periods other than the immediately preceding time period.

Figure 10:
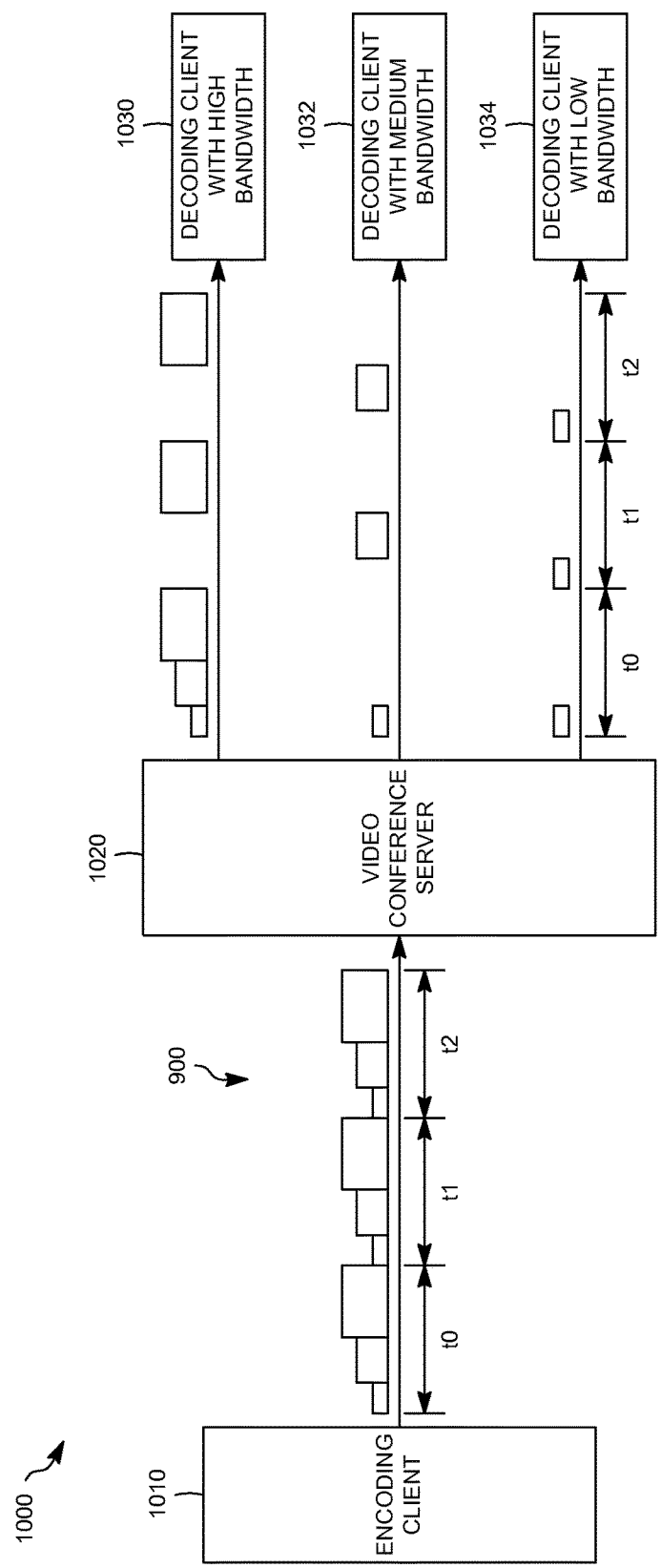
FIG. 10 is a diagram showing transmission of video streams between an encoding client, a video conference server, and a plurality of decoding clients during video conference start-up.

FIG. 10 shows a system 1000 in which video streams are transmitted between an encoding client 1010, a video conference server 1020, a first decoding client 1030, a second decoding client 1032, and a third decoding client 1034. The first decoding client 1030 has high bandwidth, the second decoding client 1032 has medium bandwidth, and the third decoding client 1034 has low bandwidth. Initially, the encoding client 1010 transmits the single video stream 900 to the video conference server 1020. The video conference server 1020 determines which of the frames from the single video stream 900 will be transmitted to each of the decoding clients 1030, 1032, 1034.

The first decoding client 1030 has high bandwidth, and therefore, the video conference server 1020 transmits high-resolution video to the first decoding client. During time period $t_0$, the video conference server 1020 transmits the low-resolution intra-frame I, the medium-resolution predicted frame $P_M$, and the high-resolution predicted frame $P_H$ to the decoding client 1030. The video frame for time period $t_0$ is therefore decoded by the first decoding client 1030 with reference to the low-resolution intra-frame I and the medium-resolution predicted frame $P_M$, utilizing reference frame scaling, as previously discussed. In time period $t_1$ and in subsequent time periods, the decoding client 1030 receives the high-resolution predicted frame $P_H$ for the respective time period, which references another high-resolution frame from a prior time period.

The second decoding client 1032 has medium bandwidth and therefore receives medium-resolution video from the video conference server 1020. During time period $t_0$, the low-resolution intra-frame I and the medium-resolution predicted frame $P_M$ are transmitted from the video conference server 1020 to the second decoding client 1032. The medium resolution predicted frame $P_M$ for time period $t_0$ is then decoded by the second decoding client 1032 with reference to the low-resolution intra-frame I for time period $t_0$ using reference frame scaling. During time period $t_1$ and subsequent time periods, the second decoding client 1032 receives the medium-resolution predicted frame $P_M$ for the respective time period, which is decoded with reference to the medium-resolution predicted frame for a prior time period.

The third decoding client 1034 has low bandwidth and therefore receives low-resolution video from the video conference server 1020. During time period $t_0$, the third decoding client 1034 receives the low-resolution intra-frame I from the video conference server, and that frame is decoded. During time period $t_1$ and subsequent time periods, the third decoding client 1034 receives a low-resolution predicted frame $P_L$, which is decoded with reference to a low-resolution frame from a prior time period.

Figure 11:
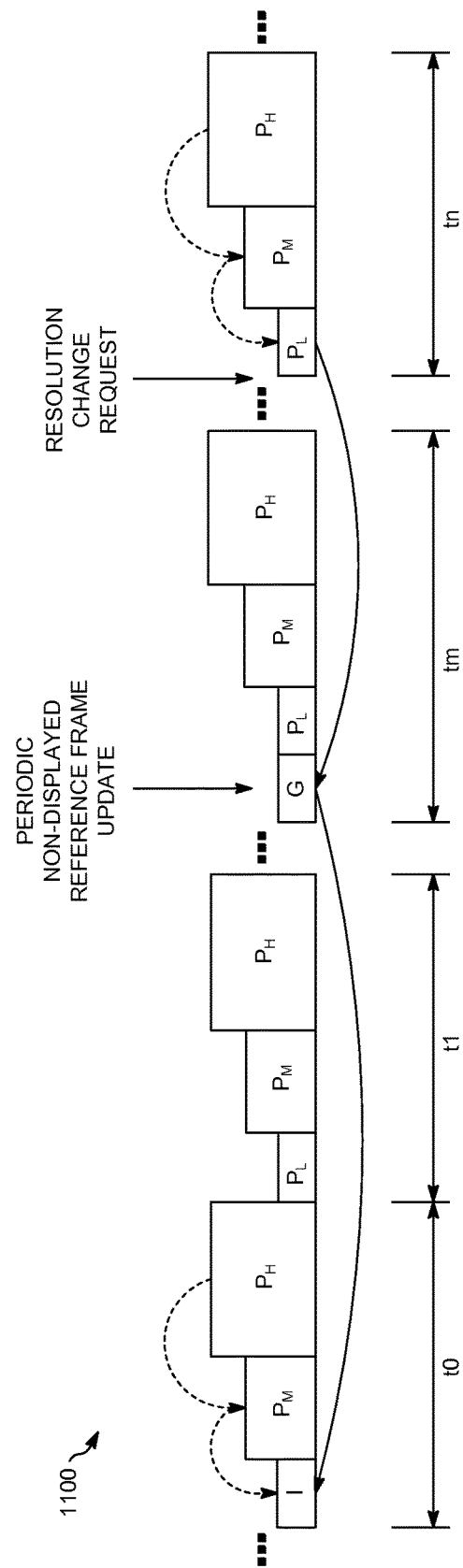
FIG. 11 is a diagram showing a coding pattern in a single stream containing video frames to allow a resolution change without a keyframe.

FIG. 11 shows a video stream 1110 that includes a coding pattern change. The video stream 1110 can be transmitted, for example, from the encoding client 1010 to the video conference server 1020 in the system 1000. In the video stream 1110, time periods $t_0$ and $t_1$ are the same as in the single video stream 900. At a time period $t_m$ subsequent to time period $t_1$, the video stream 1110 includes a non-displayed anchor frame G in addition to a low-resolution predicted frame $P_L$, a medium-resolution predicted frame $P_M$ and a high-resolution predicted frame $P_H$. Many iterations of transmission of the non-displayed anchor frame G can occur periodically during transmission of the video stream 900, such as at predetermined intervals or at times determined in any manner.

The non-displayed anchor frame G is a frame that will be transmitted to all of the decoding clients by the video conference server, regardless of the resolution that any particular decoding client is currently using. The non-displayed anchor frame G is sent at a single resolution so that all of the decoding clients receive the non-displayed anchor frame G at the same resolution. In one implementation, the resolution of the non-displayed anchor frame is the same resolution as the lowest resolution frames being used by any decoding client. In this example, the resolution of the non-displayed anchor frame G is the same resolution as the low-resolution predicted frames $P_L$.

When the frames for time period $t_m$ are received at the video conference server 1020, the video conference server will send the non-displayed anchor frame G to all of the decoding clients 1030, 1032, 1034 along with the frame that they would normally receive for time period $t_m$. Accordingly, the video conference server 1020 transmits the non-displayed anchor frame G and the high-resolution predicted frame $P_H$ to the first decoding client 1030, the video conference server 1020 transmits the non-displayed anchor frame and the medium-resolution predicted frame, $P_M$ to the second decoding client 1032, and the video conference server 1020 sends the non-displayed anchor frame G along with the low-resolution predicted frame $P_L$ to the third decoding client 1034.

The non-displayed anchor frame G is stored in a frame buffer at each of the decoding clients 1030, 1032, 1034. Typically, the non-displayed anchor frame G itself is not displayed by any of the decoding clients 1030, 1032, 1034. Instead, the non-displayed anchor frame G is used as a reference frame when decoding other frames.

In one implementation, the encoding client 1010 sends the non-displayed anchor frame G in a manner that allows each of the clients to store the same independently decodable frame, and that independently decodable frame is directly stored at each of the decoding clients 1030, 1032, 1034. For example, the encoding client 1010 can send the non-displayed anchor frame as an update in the form of a predicted frame that is encoded with reference to either of a previous non-displayed anchor frame or the intra-frame I.

Time period $t_n$ occurs subsequent to time period $t_m$, and can be separated from $t_m$ by the passage of a large number of time periods. Time period $t_m$ occurs subsequent to a resolution change request. The resolution change request can be made for a number of reasons, such as for changing bandwidth conditions, or a change in the size at which a video is displayed on a display screen at one of the decoding client. As one example, the resolution change request can be made by one of the decoding clients 1030, 1032, 1034 in response to a user input. As another example, the resolution change request can be made by the video conference server 1020, upon detecting a bandwidth change between the video conference server 1020 and one of the decoding clients 1030, 1032, 1034. As another example, the resolution change request can be made by the encoding client 1010 in response to changing bandwidth conditions between the encoding client 1010 and the video conference server.

The resolution change request is transmitted to the encoding client 1010. As an example, if the resolution change request originates from one of the decoding clients 1030, 1032, 1034, the resolution change request can be transmitted from the decoding client to the video conference server 1020 and then relayed from the video conference server 1020 to the encoding client 1010.

In time period $t_n$, the encoding client transmits a set of frames that are encoded relative to the non-displayed anchor frame. In the illustrated example, predicted frame $P_L$ for time period $t_n$ is a predicted frame that references the non-displayed anchor frame transmitted by the encoding client during time period $t_m$. The medium-resolution predicted frame $P_M$ for the time period $t_n$ is a predicted frame that references the low-resolution predicted frame $P_L$ for the time period $t_n$, and the decoding clients will apply reference frame scaling to the low-resolution predicted frame $P_L$ in order to decode the medium-resolution reference frame $P_M$. The high-resolution predicted frame $P_H$ for time period $t_n$ is a predicted frame that is encoded relative to the medium-resolution predicted frame $P_M$ for time period $t_n$. Therefore, decoding the high-resolution predicted frame $P_H$ requires that a decoding end point first decode the low-resolution reference frame $P_L$ using the non-displayed anchor frame G, then apply reference frame scaling to the low-resolution predicted frame $P_L$ and utilize it as a basis for decoding the medium-reference predicted frame $P_M$, which is then utilized as a basis for decoding the high-resolution predicted frame $P_H$ again by applying reference frame scaling to the medium-resolution predicted frame $P_M$. Alternatively, frames $P_M$ and $P_H$ for time period $t_n$ may also be directly predicted from non-displayed anchor frame G and not from the lower resolution frame(s).

Figure 12:
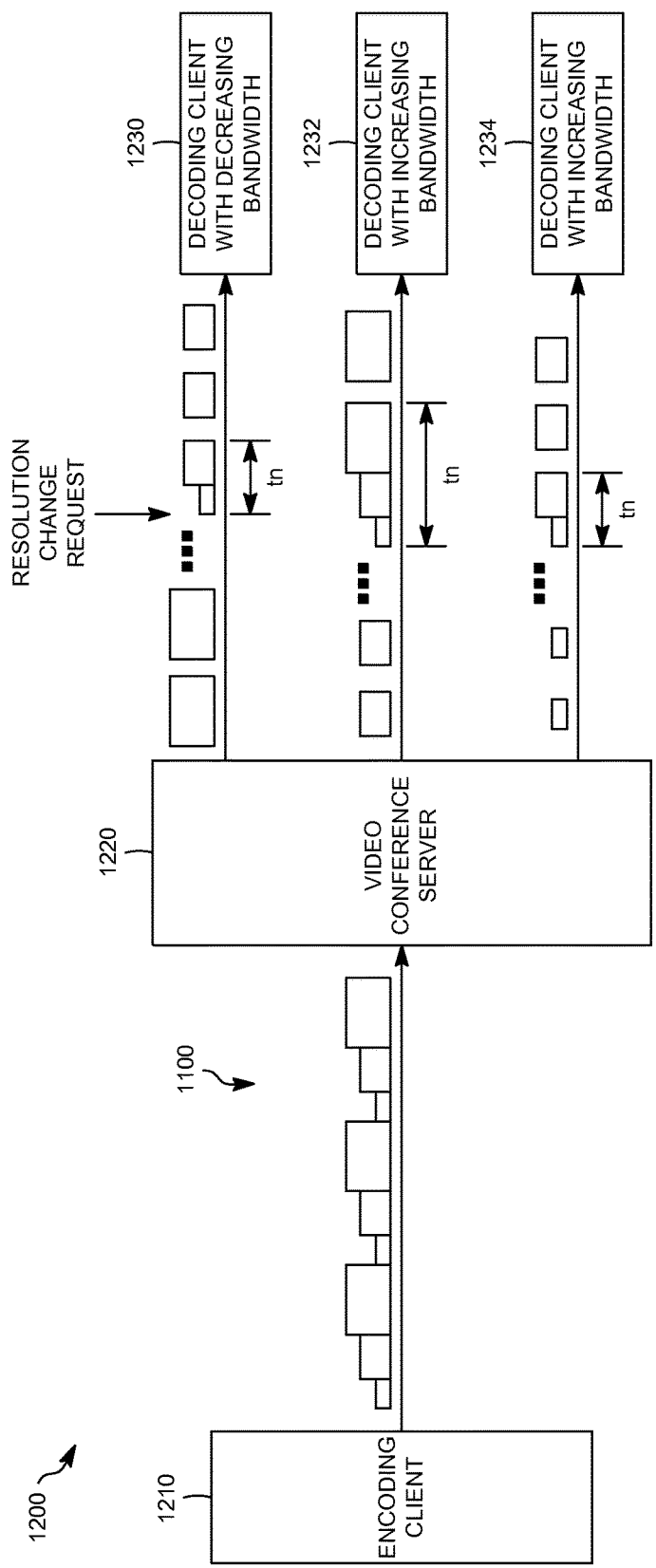
FIG. 12 is a diagram showing transmission of video streams between an encoding client, a video conference server, and a plurality of decoding clients during a resolution change.

FIG. 12 shows a video conferencing system 1200 that includes an encoding client 1210, a video conference server 1220, a first decoding client 1230, a second decoding client 1232, and a third decoding client 1234. The clients and server in the video conferencing system 1200 are similar to equivalent clients and servers in the video conferencing system 1000. In the video conferencing system 1200, the first decoding client 1230 has decreasing bandwidth, the second decoding client 1232 has increasing bandwidth, and the third decoding client 1234 has increasing bandwidth.

The encoding client 1210 is transmitting the video stream 1110 to the video conference server 1220. The video conference server 1220 forwards portions of the video stream 1110 to the decoding clients 1230, 1232, 1234. Prior to a resolution change request, the video conference server 1220 transmits high-resolution frames to the first decoding client 1230, medium-resolution frames to the second decoding client 1232, and low-resolution frames to the third decoding client 1234.

Subsequent to receiving a resolution change request, the encoding client 1210 transmits a set of frames during time period $t_n$. These frames are encoded relative to a previously transmitted non-displayed anchor frame, such as the most recent non-displayed anchor frame. For example, this can be the non-displayed anchor frame described as being transmitted as during time period $t_m$ in FIG. 11 as previously described. Upon receiving the frames for time period $t_n$, the video conference server transmits one or more frames from the time period $t_n$ of the video stream 1110 to each of the decoding clients 1230, 1232, 1234 according to the resolution of the frames that the respective decoding client will be receiving subsequent to the resolution change request.

The first decoding client 1230 is experiencing decreasing bandwidth, and therefore will receive medium-resolution frames subsequent to the resolution change request. Therefore, during time period $t_n$, the video conference server forwards the low-resolution predicted frame $P_L$ and the medium-resolution predicted frame $P_M$ for the time period $t_n$ to the first decoding client 1230.

The second decoding client 1232 is experiencing increasing bandwidth and will be receiving the high-resolution frames from the video stream 1110 subsequent to the resolution change request. Thus, during time period $t_n$, the video conference server 1220 transmits the low-resolution predicted frame $P_L$, the medium-resolution predicted frame $P_M$, and the high-resolution predicted frame $P_H$ for the time period $t_n$ to the second decoding client 1232.

The third decoding client 1234 is experiencing increasing bandwidth and will receive medium resolution frames subsequent to the resolution change request. Thus, during the time period $t_n$, the video conference server 1220 transmits the low-resolution predicted frame $P_L$ and the medium-resolution predicted frame $P_M$ to the third decoding client 1234.

Each of the decoding clients 1230, 1232, 1234 will decode the frames received from the video conference server 1220 during the time period $t_n$ using the most recent non-displayed anchor frame that was received from the video conference server and is stored in the respective frame buffer for each of the decoding clients.

Figure 13:
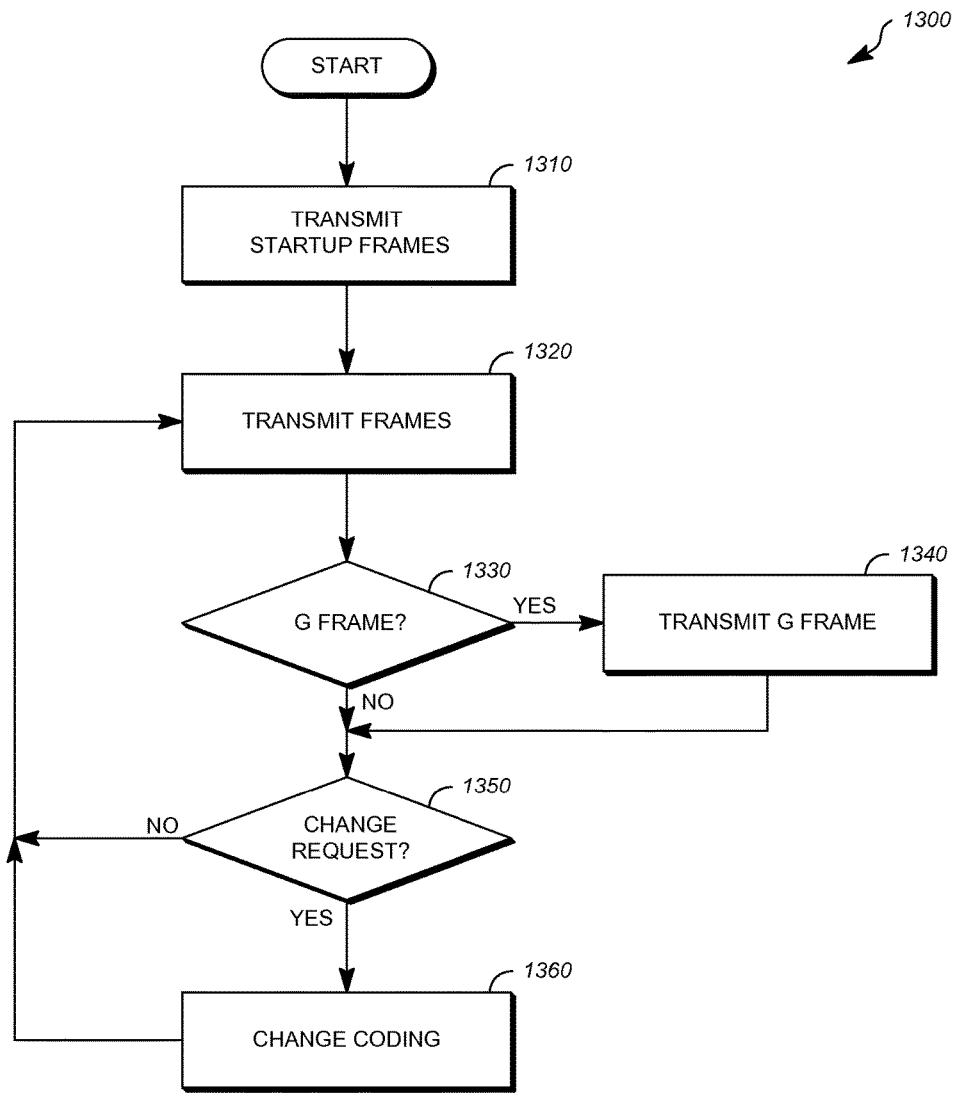
FIG. 13 is a flowchart showing encoding and transmission of a video stream by an encoding client.

FIG. 13 shows an example of a process 1300 for encoding and transmitting a video stream from an encoding client to a video conference server. In this example, the video stream includes frames of multiple resolutions such as a low resolution, a medium resolution, and a high resolution. However, frames in any number of resolutions can be provided in the video stream. Process 1300 can be implemented by an encoder such as the encoder 470, at the encoding client 1010. Process 1300 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 1300. Process 1300 can also be implemented using hardware. As explained above, some computing devices may have multiple memories and multiple processors, and the steps of process 1300 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 1300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

In operation 1310, startup frames are transmitted for an initial time period. This can be a transmission from an encoding client to a video conference server. The startup frames include an intra frame and can include one or more additional frames from the same time period, with the additional frames being encoded at a different resolution than the intra frame. As an example, the startup frames can be similar to the frames I, $P_M$, and $P_H$ of time period $t_0$ in FIG. 9. Thus, the startup frames for the initial time period can include an intra frame and one or more frames of resolutions that are different that the resolution of the intra frame and are encoded with reference to the intra frame using reference frame scaling. In one implementation, operation 1310 includes transmitting, from an encoding client to a video conference server, an encoded video stream that includes a reference frame, a plurality of first-resolution frames that are encoded relative to the reference frame, and a plurality of second-resolution frames that are encoded relative to the reference frame.

In operation 1320, frames are transmitted for a time period subsequent to the initial time period. Each transmission of frames can include the same image at multiple resolutions, with each frame encoded with reference to a frame of the same resolution from a previous time period.

At operation 1330, a decision is made as to whether to transmit a non-displayed anchor frame. This decision can be made based on passage of time, changes in video content, or any other suitable factor. If a non-displayed anchor frame is to be transmitted, the process proceeds to operation 1340. Transmission of the non-displayed anchor frame at operation 1340 includes information sufficient for the decoding client to define a complete frame of video data at the non-displayed anchor frame resolution. The resolution of the non-displayed anchor frame can be, for example, the resolution of the lowest resolution frames transmitted by the encoding client. The non-displayed anchor frame will be relayed to all decoding clients for use when one of the clients changes resolution. Subsequent to transmission of the non-displayed anchor frame or subsequent to a decision to not transmit a non-displayed anchor frame, the process proceeds to operation 1350.

At operation 1350, a determination is made as to whether a change request was received. The change request is a request to change resolution that is received at the decoding client. The change request can be received from the video conference server. The request can originate from the video conference server or from one of the decoding clients. If no change request is received, the process returns to operation 1320.

If a change request is received at operation 1350, the process proceeds to operation 1360, where a coding change is executed by the encoding client. Thus, in response to receiving the request to change resolution, the encoding client encodes a set of frames that are encoded relative to the non-displayed anchor frame, and transmits the set of frames to the video conference server in the video stream. The set of frames can be as described with respect to time period $t_n$ of FIG. 11, where the low resolution frame is decoded with reference to the most recently received non-displayed anchor frame, the medium resolution frame is decoded relative to the low resolution frame using reference frame scaling, and the high resolution frame is decoded relative to the medium resolution frame using reference frame scaling. The process then returns to operation 1320.

Figure 14:
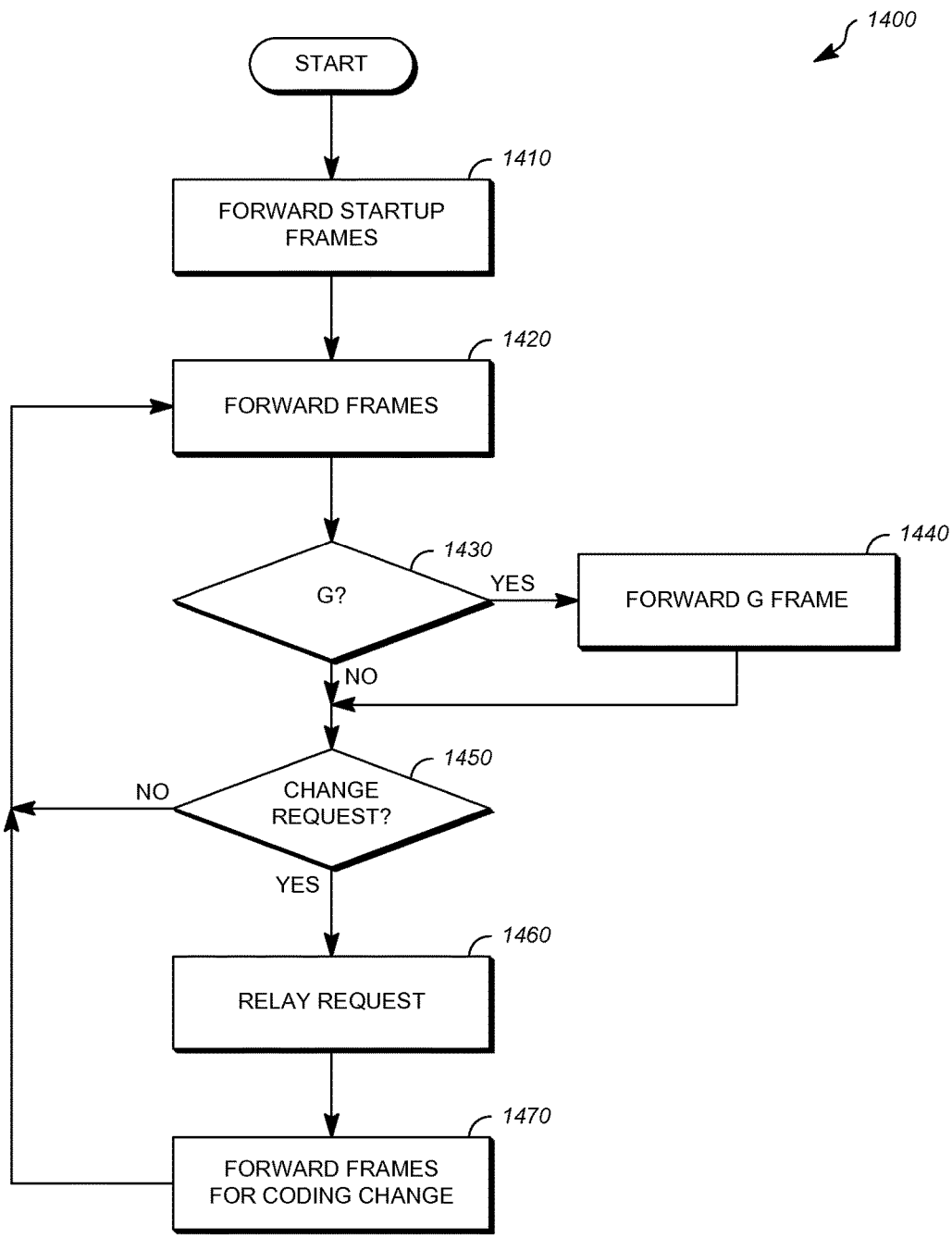
FIG. 14 is a flowchart showing receipt and transmission of a video stream by a video conference server.

FIG. 14 is an example of a process 1400 for receiving and transmitting a video stream by a video conference server. In this example, the video stream includes frames of multiple resolutions such as a low resolution, a medium resolution, and a high resolution. However, frames in any number of resolutions can be provided in the video stream. Process 1400 can be implemented, for example, by the video conference server 1020 of FIG. 10. Process 1400 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 1400. Process 1400 can also be implemented using hardware. As explained above, some computing devices may have multiple memories and multiple processors, and the steps of process 1400 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 1400 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At operation 1410, startup frames are received and forwarded. The startup frames are as described previously at operation 1310 of FIG. 13. The startup frames are forwarded to decoding clients according to the resolution utilized by each of the decoding clients. All of the encoding clients receive an intra frame. Each the decoding clients may also receive one or more additional frames to allow the decoding client to define a frame at a desired resolution, as explained with respect to time period $t_0$ of FIG. 9.

At operation 1420, frames are received and forward. In contrast to the startup frames of operation 1410, the frames transmitted at operation 1420 represent nominal operation of the system, with the transmission of frames for each time period including one frame at each resolution, with each frame being encoded with reference to a same-resolution frame from a previous time period.

At operation 1430, a determination is made as to whether a non-displayed anchor frame has been received. If a non-displayed anchor frame has been received, it is transmitted to all of the decoding clients at operation 1440, along with the frame for the same time period. Subsequent to transmission of the non-displayed anchor frame or subsequent to determining that no non-displayed anchor frame was received, the process proceeds to operation 1450.

At operation 1450, a determination is made as to whether a change request should be transmitted to the encoding client. A change request can be received at the video conference server from a decoding client or can be generated at the video conference server. The change request can be made, for example, in response to determining that bandwidth conditions have changed for one or more of the decoding clients. If no change request has been made the process returns to operation 1420. Otherwise the process proceeds to operation 1460, where the resolution change request is transmitted to the encoding client.

Subsequent sending the resolution change request, the encoding client will encode and transmit a set of frames in response to the resolution change request. These frames are encoded with reference to the most recently transmitted non-displayed anchor frame, and can be decoded by the decoding clients using the non-displayed anchor frame and by applying reference frame scaling. In operation 1470, the set of frames encoded in response to the resolution change request is received by the video encoding server, and portions of the set of frames are forwarded to the decoding clients according to the video resolution to be decoded by each of the decoding clients subsequent to the coding change. This can be performed in the manner described with reference to FIG. 11. The process then returns to operation 1420.

Figure 15:
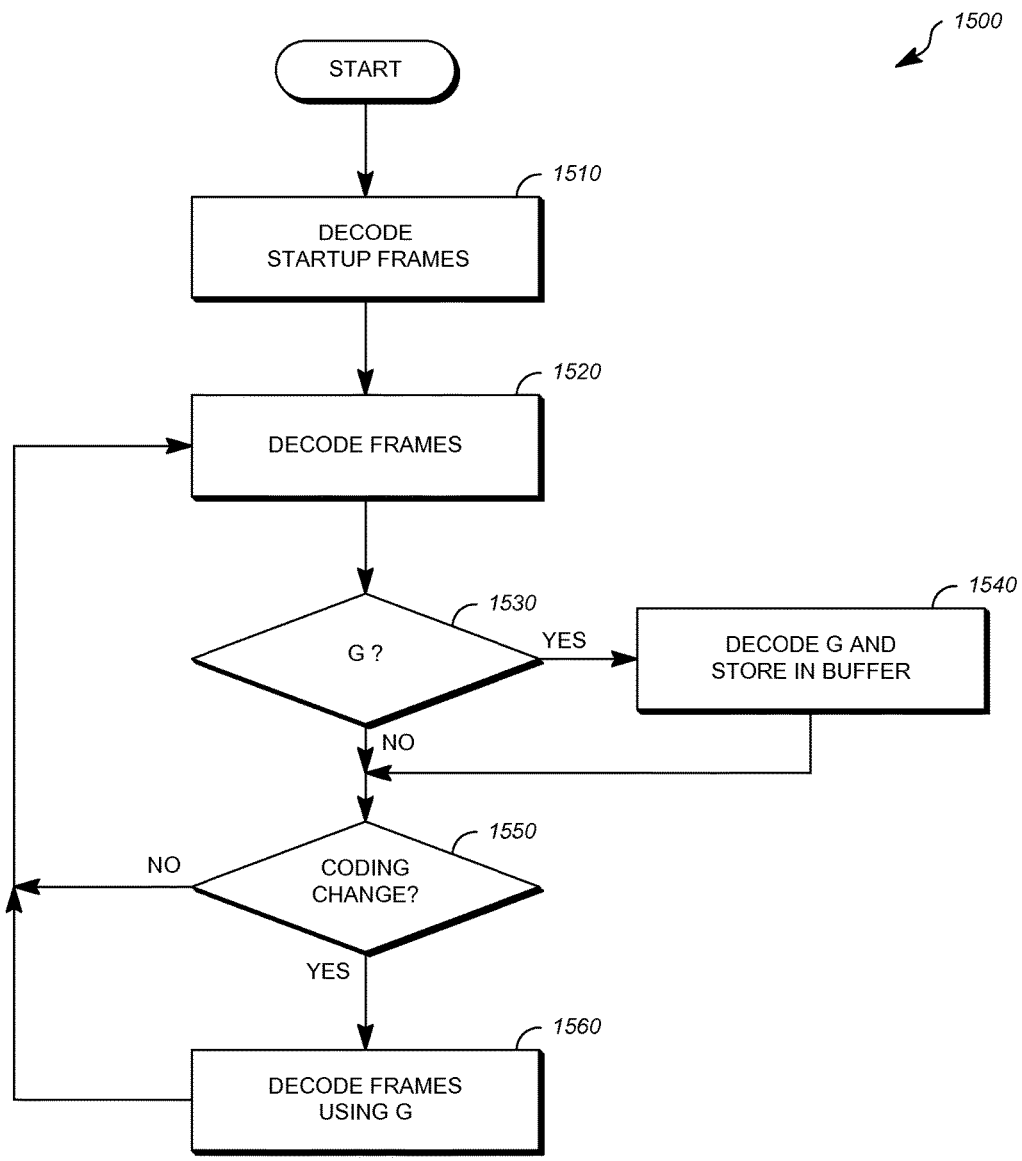
FIG. 15 is a flowchart showing receipt and decoding of a video stream by a decoding client.

FIG. 15 is an example of a process 1500 for receiving and decoding a video stream at an encoding client. In this example, the video stream includes frames of multiple resolutions such as a low resolution, a medium resolution, and a high resolution. However, frames in any number of resolutions can be provided in the video stream. Process 1500 can be implemented, for example, by the decoder 500 at the decoding endpoints 1030, 1032, 1034 of FIG. 10. Process 1500 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 1500. Process 1500 can also be implemented using hardware. As explained above, some computing devices may have multiple memories and multiple processors, and the steps of process 1500 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 1500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Operation 1510 includes receiving and decoding startup frames. The startup frames received during an initial time period include an intra frame as a reference frame and may include one or more additional frames, as previously described. Decoding may be performed by using reference frame scaling. For example, if the decoding endpoint is using high resolution video, it may receive a low resolution reference frame that is decoded, scaled, and then used for decoding a medium resolution frame from the same time period, which is likewise decoded, scaled, and used to decode a high resolution reference frame from the same time period. Thus, operation 1510 can include receiving, at a first decoding client from a video conference server, an encoded video stream that includes a reference frame and a plurality of first-resolution frames that are encoded relative to the reference frame. Operation 1510 can also include decoding, at the first decoding client, at least some frames from the plurality of first-resolution frames using the reference frame.

Operation 1520 represents receiving and decoding frames in time periods subsequent to the initial time period. In operation 1520, received frames can be decoded with reference to a same-resolution frame from a previous time period.

In operation 1530, if a non-displayed anchor frame is received, the process proceeds to operation 1540 where the non-displayed anchor frame is decoded and stored in a buffer. Subsequent to decoding and storing the non-displayed anchor frame or if a non-displayed anchor frame was not received, the process advances to operation 1550.

In operation 1550, a determination is made as to whether received frames indicate a coding change made in order to allow a change in the resolution being decoded at one of the decoding clients. If there is no coding change, the process returns to operation 1520. Otherwise the process proceeds to operation 1560.

If a coding change is identified, operation 1560 includes utilizing the non-displayed anchor frame to decode frames for the current time period, with reference frame scaling being applied if the resolution used at the decoding client is different (e.g. higher) than the resolution of the non-displayed anchor frame. If the decoding client is changing resolutions, it will use the non-displayed anchor frame to decode a frame that is of a different resolution that the frames decoded at operation 1520. Thus, operation 1560 can include, subsequent to decoding the non-displayed anchor frame, receiving at least one second resolution frame that is encoded relative to the decoded non-displayed anchor frame, and decoding the at least one second resolution frame using the decoded non-displayed anchor frame.

Figure 16:
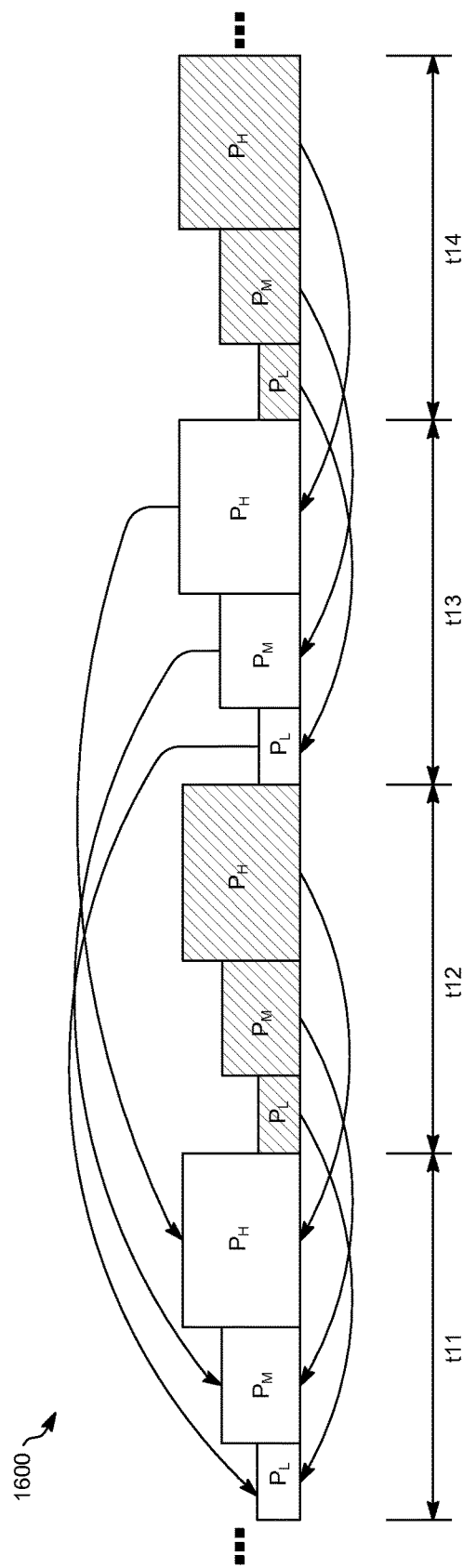
FIG. 16 is a diagram showing a coding pattern of a single stream of video frames for temporal scalability by dropping frames.

FIG. 16 shows a video stream 1600 with a coding pattern that allows for frame dropping to provide temporal scalability. The coding pattern of the video stream 1600 can be used in combination with the previously-described coding patterns to allow for resolution changes and temporal scalability from a single stream of video frames that is transmitted from an encoding client.

In the illustrated example, the video stream 1600 includes four time periods. The frames in each time period are low-resolution, medium-resolution, and high-resolution predicted frames. In successive time periods, the coding pattern alternates between encoding frames with reference to frames of the same resolution in the immediately preceding time period, and encoding frames with reference to frames of the same resolution in a time period that occurred before the immediately preceding time period, such as a time period that occurred two time periods ago.

In this example, the frames in time period $t_{12}$ are encoded with reference to same resolution frames from time period $t_{11}$. Frames from time period $t_n$ are encoded with reference to same resolution frames from time period $t_{11}$. Frames from time period $t_{14}$ are encoded with reference to same resolution from time period $t_{13}$. This coding pattern can continue repeatedly in the same manner.

The frames from time periods $t_{12}$ and $t_{14}$ are never referenced by a subsequent frame and therefore are not needed to decode any subsequent frame. Because of this, the frames from time periods $t_{12}$ and $t_{14}$ can be dropped. Thus, the video conference server can receive all of the frames from the video stream 1600 and then transmit those frames to the decoding clients at either a high frame rate by transmitting frames for all time periods to the respective decoding client, or at a low frame rate by transmitting frames only from time periods $t_{11}$ and $t_{13}$ to the decoding client and dropping some or all of the frames that are not utilized by subsequent frames as reference frames, such as those in time periods $t_{12}$ and $t_{14}$.

Figure 17:
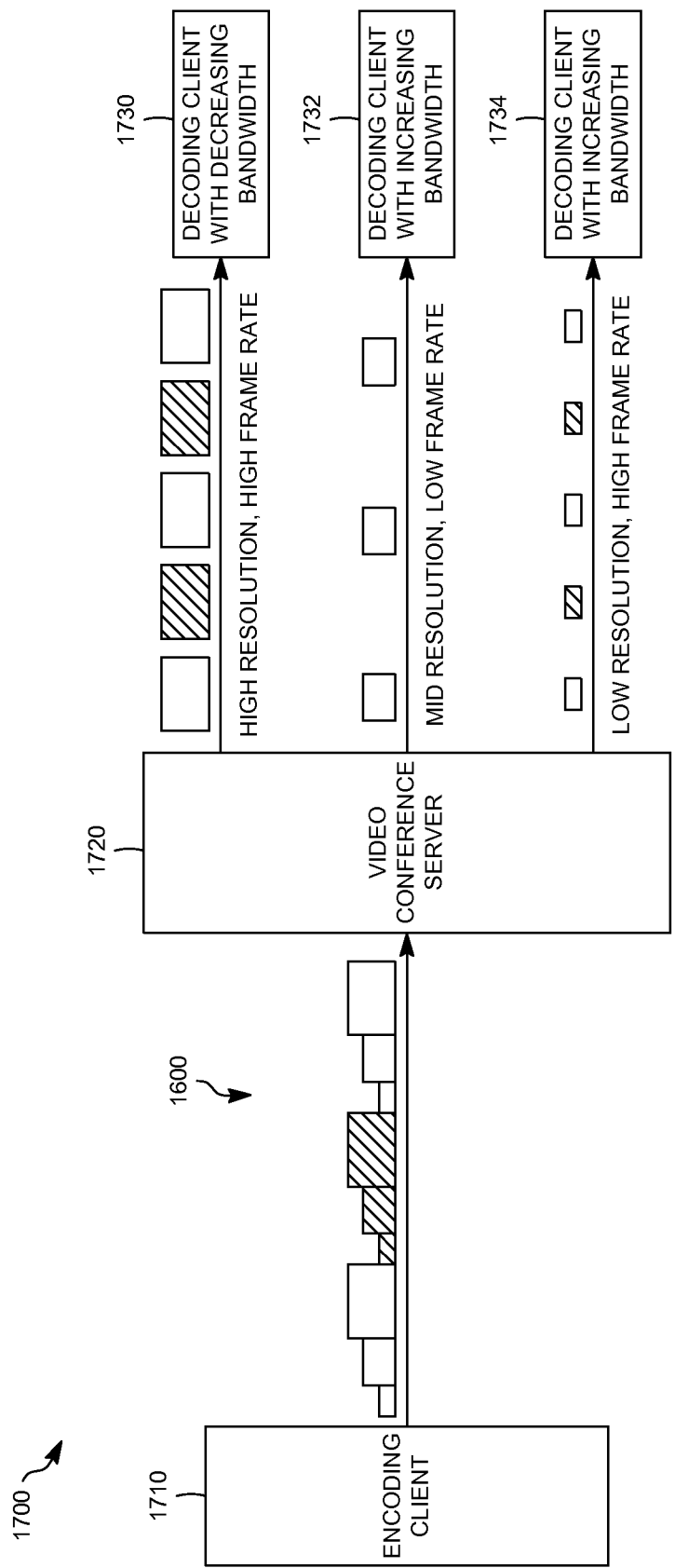
FIG. 17 is a diagram showing transmission of video streams between an encoding client, a video conference server, and a plurality of decoding clients with temporal scalability.

FIG. 17 shows a video conferencing system 1700 in which an encoding client 1710 transmits the video stream 1600 to a video conference server 1720. The video conference server 1720 transmits portions of the video stream 1600 to each of a first decoding client 1730, a second decoding client 1732, and a third decoding client 1734. The first decoding client 1730 has high bandwidth and is receiving the video at high-resolution and high frame rate. The second decoding client 1732 has medium bandwidth and is receiving the video at medium-resolution and a low frame rate. The third decoding client 1734 has low bandwidth and is receiving the video at low-resolution and high frame rate.

As previously explained, the video stream 1600 includes frames that can be dropped because they are not utilized by any subsequent frame for decoding. This allows the video conference server to drop some of the frames from the video stream 1600 when relaying the video stream to some or all of the decoding clients. This is shown with respect to second decoding client 1732, which receives only non-droppable frames at a frame rate that is half the frame rate at which video is sent to the first decoding client 1730 and the third decoding client 1734, each of which receive the droppable frames in addition to the non-droppable frames.

The foregoing examples employ a client-server architecture, with information being relayed by servers such as the video conference server 1020 of FIG. 10, the video conference server 1220 of FIG. 12, and the video conference server 1720 of FIG. 17. It should be understood, however, that the methods discussed herein can be implemented using a peer-to-peer architecture in which the video conference servers are omitted. For example, in the system 1000, the video conference server 1020 would be omitted, making transmission of the single stream 900 unnecessary. Instead, the transmission described as being made by the video conference server 1020 would be made by the encoding client 1010.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:
1. A method, comprising:
    encoding, by an encoding client, a plurality of first-resolution frames and a plurality of second-resolution frames, wherein each of the first-resolution frames and each of the second-resolution frames is encoded with reference to a respective same resolution frame from a previous time period;
    transmitting, from the encoding client to a first remote computing system, an encoded video stream that includes the plurality of first-resolution frames and the plurality of second-resolution frames;
    transmitting, from the encoding client to the first remote computing system in the encoded video stream, a first-resolution non-displayed anchor frame, wherein the first-resolution non-displayed anchor frame is transmitted periodically during transmission of the encoded video stream;
    receiving, at the encoding client from the first remote computing system, a request to change resolution;
    in response to receiving the request to change resolution, performing a coding change in which the encoding client encodes a set of frames that are encoded with reference to the non-displayed anchor frame; and
    transmitting, from the encoding client to the first remote computing system in the encoded video stream, the set of frames that are encoded relative to the first-resolution non-displayed anchor frame.

2. The method of claim 1, further comprising:
transmitting, from the encoding client to the first remote computing system, a first-resolution intra frame during an initial time period, wherein at least one frame from the plurality of second-resolution frames that is transmitted during the initial time period is encoded relative to the first-resolution intra frame.

3. The method of claim 1, wherein the plurality of first-resolution frames correspond temporally to the plurality of second-resolution frames.

4. The method of claim 1, wherein all of the frames from the set of frames correspond to a single time period.

5. The method of claim 1, wherein the first remote computing system includes a video conference server operable to forward portions of the encoded video stream to each of a plurality of decoding clients.

6. The method of claim 5, wherein the request to change resolution originates at a first decoding client from the plurality of decoding clients and is relayed to the encoding client by the video conference server.

7. The method of claim 5, wherein the video conference server is operable to relay one or more frames from the set of frames to each of the plurality of decoding clients.

8. The method of claim 5, wherein prior to the request to change resolution, the video conference server forwards at least some of the plurality of first-resolution frames to a first decoding client of the plurality of decoding clients, and the video conference server forwards at least some of the plurality of second-resolution frames to a second decoding client of the plurality of decoding clients.

9. The method of claim 5, wherein the first-resolution non-displayed anchor frame is not output for display by any of the decoding clients from the plurality of decoding clients.

10. A method, comprising:
receiving, at a first decoding client from a first remote computing system, an encoded video stream that includes a plurality of first-resolution frames, wherein each of the first-resolution frames is encoded with reference to a respective same resolution frame from a previous time period;
decoding, at the first decoding client, at least some frames from the plurality of first-resolution frames using the respective same resolution frame from the previous time period;
receiving, at the first decoding client from the first remote computing system, a first-resolution non-displayed anchor frame, wherein the first-resolution non-displayed anchor frame is received periodically during reception of the encoded video stream;
decoding, at the first decoding client, the first-resolution non-displayed anchor frame;
subsequent to decoding the first-resolution non-displayed anchor frame, receiving, at the first decoding client, at least one second-resolution frame that is encoded relative to the decoded first-resolution non-displayed anchor frame; and
decoding, at the first decoding client, the at least one second-resolution frame using the decoded first-resolution non-displayed anchor frame.

11. The method of claim 10, further comprising:
outputting, for display by the decoding client, at least some of the at least some frames from the plurality of first-resolution frames and the at least one second-resolution frame.

12. The method of claim 10, wherein the first-resolution non-displayed anchor frame is not output for display by the decoding client.

13. The method of claim 10, further comprising:
prior to receiving the at least one second-resolution frame that is encoded relative to the first-resolution non-displayed anchor frame, transmitting a request to change resolution to the first remote computing system.

14. The method of claim 10, wherein decoding the at least one second-resolution frame using the decoded first-resolution non-displayed anchor frame includes scaling the decoded first-resolution non-displayed anchor frame to increase the resolution of the decoded first-resolution non-displayed anchor frame.

15. The method of claim 10, wherein the at least one second-resolution frame that is encoded relative to the first-resolution non-displayed anchor frame is received at the first decoding client in response to a request to change resolution that is received at the first remote computing system from a second decoding client.

16. The method of claim 10, further comprising:
storing the decoded first-resolution non-displayed anchor frame in a frame buffer at the first decoding client.

17. A method, comprising:
receiving, from an encoding client at a video conference server, an encoded video stream that includes a plurality of first-resolution frames and a plurality of second-resolution frames, wherein each of the first-resolution frames and each of the second-resolution frames is encoded with reference to a respective same resolution frame from a previous time period;
transmitting the plurality of first-resolution frames to at least some decoding clients from the plurality of decoding clients;
transmitting the plurality of second-resolution frames to at least some decoding clients from the plurality of decoding clients;
receiving, from the encoding client at the video conference server in the encoded video stream, a first-resolution non-displayed anchor frame, wherein the first-resolution non-displayed anchor frame is received periodically during receipt of the encoded video stream;
transmitting the first-resolution non-displayed anchor frame to all of the plurality of decoding clients, wherein the first-resolution non-displayed anchor frame is transmitted periodically during transmission of the plurality of first-resolution frames and transmission of the plurality of the second-resolution frames;
transmitting, to the encoding client from the video conference server, a request to change resolution;
in response to receiving the request to change resolution, receiving, from the encoding client at the video conference server in the encoded video stream, a set of frames that are encoded relative to the first-resolution non-displayed anchor frame; and
transmitting one or more frames from the set of frames to each of the plurality of decoding clients.

18. The method of claim 17, further comprising:
receiving, at the video conference server from the encoding client, a first-resolution intra frame during an initial time period, wherein at least one frame from the plurality of second-resolution frames that is transmitted during the initial time period is encoded relative to the first-resolution intra frame.

19. The method of claim 17, wherein the request to change resolution originates at a first decoding client from the plurality of decoding clients and is relayed to the encoding client by the video conference server.

* * * * *